United States Patent [19]

Thometzek et al.

[11] Patent Number: 5,348,914
[45] Date of Patent: Sep. 20, 1994

US005348914A

[54] GRANULAR MATERIALS, A PROCESS FOR THEIR PRODUCTION AND THEIR USE

[75] Inventors: Peter Thometzek, Krefeld, Fed. Rep. of Germany; Heinrich Christ, San Vito, Italy

[73] Assignee: Ferro Corporation, Cleveland, Ohio

[21] Appl. No.: 73,393

[22] Filed: Jun. 7, 1993

[30] Foreign Application Priority Data

Jun. 17, 1992 [IT] Italy .................... MI 92A 001488

[51] Int. Cl.$^5$ ............................... C03C 8/20
[52] U.S. Cl. ........................... 501/18; 501/17; 106/480; 106/483; 106/600; 106/628
[58] Field of Search .................... 501/17, 18, 32; 106/483, 480, 489, 600, 626, 628

[56] References Cited

U.S. PATENT DOCUMENTS 5,219,800  6/1993  Kelso et al. .................... 501/32

*Primary Examiner*—Karl Group
*Assistant Examiner*—Chris Gallo
*Attorney, Agent, or Firm*—Rankin, Hudak & Hill

[57] ABSTRACT

The present invention relates to abrasion-resistant granular materials which are composed of one or more inorganic pigments, one or more inorganic elements and/or compounds with a Mohs hardness of at least 7 and one or more inorganic and/or organic binders and optionally frits and/or glasses and/or inorganic fillers, and to their production and their use.

12 Claims, No Drawings

GRANULAR MATERIALS, A PROCESS FOR THEIR PRODUCTION AND THEIR USE

The present invention relates to abrasion-resistant granular materials which are composed of one or more inorganic pigments, one or more inorganic elements and/or compounds with a Mohs hardness of at least 7 and one or more inorganic and/or organic binders and optionally frits and/or glasses and/or inorganic fillers, and to their production and their use.

The production of coloured, black or white coatings of high abrasion-resistance is of great interest in the ceramics industry. In the tile industry, abrasion-resistant glazes with coloured, white or black decoration are very much sought after, particularly for floor tiles. Coloured, white or black abrasion-resistant coatings are also required in the production of highly wear-resistant components for tool manufacture.

Inorganic pigments, for example pure metal oxides or mixed phase oxides with adequate temperature stability, are used for colouring glazes. However, the hardness of these pigments is insufficient for highly wear-resistant glazes.

Corundum (with a Mohs hardness of 9) is added to glazes to increase their abrasion-resistance. However, the use of corundum and pigments side by side does not provide a solution to the problem, since despite this the pigments are easily broken out of the glaze layer when wear takes place. This leads to a reduction in colour intensity. The remaining indentations can easily become dirtied.

Coloured fused aluminas enable the pigment to be introduced into the glaze directly bonded in the $Al_2O_3$. However, they have the disadvantage that only a very restricted range of colours, together with colours of low intensity, can be produced when they are manufactured in an arc furnace. Furthermore, the process is very costly.

The problem which the invention addresses is therefore to create abrasion-resistant white, black or coloured materials which do not exhibit the above disadvantages and with which white, black or coloured abrasion-resistant coatings can be produced.

This problem can surprisingly be solved by means of the granular materials according to the invention.

The present invention relates to white, black or coloured abrasion-resistant granular materials with which white, black or coloured abrasion-resistant coatings can be produced, of the following composition:

| | |
|---|---|
| 2 to 40 weight % | of inorganic pigments, |
| 20 to 97 weight % | of one or more inorganic elements and/or compounds with a Mohs hardness of at least 7, |
| 1 to 25 weight % | of one or more inorganic and/or organic binders, |
| 0 to 50 weight % | of one or more frits and/or glasses, and |
| 0 to 40 weight % | of one or more inorganic fillers. |

Inorganic oxides, such as pure oxides, mixed phase oxides e.g. those with the rutile or spinel structure, or encapsulated pigments e.g. those based on $ZrSiO_4$, for example, are preferably used as the inorganic pigments, due to their temperature stability.

Zirconium silicate, titania and/or tin oxide are preferably used as pigments in order to obtain white pigment granules.

Black pigments preferably comprise mixed phase oxides based on Fe, Cr or Co, Fe, Ni, Cr, Mn, or Co, Fe, Ni, Cr.

Inorganic elements with a Mohs hardness of at least 7 preferably comprise hard metals. Inorganic compounds with a Mohs hardness of at least 7 preferably comprise $Al_2O_3$, cordierite, zirconia ($ZrO_2$) or quartz ($SiO_2$). Carbides, preferably SiC, $B_4C$, WC, TiC or ZrC, or nitrides, preferably $Si_3N_4$ or BN, may also be used.

Temporary binders such as starch and dextrin glues, cellulose ethers such as methylcellulose or carboxymethylcellulose, for example, binders based on polysaccharides, adhesives based on polyvinyl acetates, polyacrylates or polyvinyl alcohols, dispersion adhesives based on synthetic resins or rubber, single- or multicomponent polymerisation adhesives, polyaddition adhesives or polycondensation adhesives may be used as organic binders.

Sodium silicate, potassium silicate, aluminium phosphate, particularly mono-aluminium phosphate, chromium phosphate, particularly mono-chromium phosphate, phosphoric acid, sodium aluminium phosphate, sodium aluminate, boron phosphate, aluminium silicate, sodium calcium silicate, potassium calcium silicate, silicon phosphate, silica sol and $Al(OH)_3$ sol are preferably used as permanent inorganic binders. These binders are used either alone or in suitable combinations, in an amount from 1 to 25 weight %, preferably from 2 to 15 weight %. Furthermore, the granular product may contain one or more ceramic frits in an amount between 0 and 50 weight %. These frits preferably have the following composition:

| | |
|---|---|
| $SiO_2 + B_2O_3$ | 20 to 80 weight % |
| $Al_2O_3$ | 0 to 20 weight % |
| $R^1_2O + R^2O$ | 5 to 70 weight % |
| $TiO_2 + ZrO_2$ | 0 to 30 weight % |
| $PbO + Bi_2O_3 + P_2O_5$ | 0 to 80 weight % |
| $V_2O_5 + MoO_3 + WO_3$ | 0 to 10 weight % | where
$R^1_2O = Li_2O + Na_2O + K_2O$, and
$R^2O = MgO + CaO + SrO + BaO + ZnO$.

Oxynitride glasses and/or oxycarbide glasses may also be used.

The stability of the granular material in a glaze and the bonding between the granular material and a glaze on firing the ceramic, and thus the abrasion behaviour, can be further improved by means of the frits. A highly-lustrous, transparent frit may also preferably be incorporated in the granular materials to increase the brilliance of their colours.

The colour or depth of colour obtained after ceramic firing using the granular materials according to the invention can be modified or optimised by the selection of suitable frits.

A frit with a very high rate of crystallisation, based on the $SiO_2$—$Al_2O_3$—$Li_2O$—$TiO_2$, $SiO_2$—$Al_2O_3$—$MgO$ or $SiO_2$—$Al_2O_3$—$ZnO$ systems, for example, may also be incorporated in the granular material.

Furthermore, the micro-granular material may contain an additional inorganic filler such as kaolin, feldspar, ZnO, CaO, wollastonite or clay minerals, for example, or synthetically manufactured products such as bone ash, etc., for example.

The bonding of the granular material in the glaze or the brilliance of colour can be further improved by a suitable choice of these inorganic fillers.

The coloured, white or black granular materials preferably have a grain size distribution between >0 and 2 mm, most preferably between >0 and 0.5 mm. The <2 micron dust fraction is less than 5 weight %, preferably less than 2 weight %. The granules are substantially spherical, preferably have a narrow grain size distribution and therefore have very good flow properties. Due to their high hardness, they can be pneumatically, conveyed or recycled during glaze application without problems.

Granular materials without colorant components can obviously also be used, wherein these simply contribute to improving the abrasion-resistance of coatings. The colour (mainly white) of these granular materials then originates from the inorganic compounds with a Mohs hardness of at least 7 and/or from the binders.

The present invention also relates to a process for producing the white, black or coloured abrasion-resistant granular materials, which is characterized in that the inorganic elements and/or compounds used, with a Mohs hardness of at least 7, the inorganic pigments, optionally the frits and/or glasses and optionally the other inorganic fillers are dry- or wet-milled jointly or separately or in suitable combination to produce grain sizes from >0 to 100 microns, preferably from >0 to 40 microns, optionally freed from coarse grains by sieving or classification, dried in the case of wet-milling, subsequently pulverized, granulated in a granulation unit with one or more inorganic and/or organic binders in an amount from 1 to 25 weight %, preferably 2 to 15 weight %, based on the solids content of the binder or binders, optionally with the addition of water or other suitable liquids, and then heat-treated between 150° C. and 500° C. for up to 24 hours.

Mixer units, positive mixers, dish granulators or fluidized bed granulators may be used as the granulating units.

When wet-milling is employed, the suspension obtained after adding the inorganic and/or organic binder or binders is atomized in a spray tower to produce substantially spherical granules.

The starting materials are preferably milled in ball mills, countercurrent mills, annular gap mills, roll mills, impact mills or bead mills. The coarse grain may be separated by sieving or classification.

When the starting components are wet-milled, the granular material is preferably produced, after the addition of binder, in a spray drier, fluid bed drier or drum drier.

The heat-treatment between 150° C. and 500° C. which is preferably carried out after granulation serves to further harden or strengthen the grains of granular material.

The granular material may also be produced in a hot gas reactor with intense turbulence (e.g. a Maurer Turbulator or Babcock Reaction Chamber) at temperatures up to 1500° C.

The white, black or coloured granular materials according to the invention are used for the production of wear-resistant ceramic coatings. The granular materials according to the invention are preferably used in tiles, particularly in floor tiles, as a protection against wear.

In addition, the granular materials according to the invention can be used for colouring ceramic glazes or enamel glazes, or for colouring lacquers, plastics, glasses, etc.

A further application is in grinding media. The granular materials according to the invention may be applied by spreading, screen application, spray-gun application, including spraying in an electrostatic field, and by plasma spraying. Plasma spraying on to metals is preferably carried out using granular materials containing $Si_3N_4$ or SiC.

EXAMPLE 1

The following starting materials were introduced into a positive mixer (a product of Eirich):

0.40 kg of a blue pigment based on alumina and cobalt oxide 0.90 kg alumina with an $Al_2O_3$ content greater than 97 weight % and a grain size distribution corresponding to 80 weight % less than 40 μm 0.40 kg of a ceramic frit of the following composition was added:

| | |
|---|---|
| $SiO_2$ | 58.2 weight % |
| $B_2O_3$ | 7.7 weight % |
| $Al_2O_3$ | 9.5 weight % |
| $Na_2O$ | 1.3 weight % |
| $K_2O$ | 3.6 weight % |
| MgO | 1.4 weight % |
| CaO | 15.1 weight % |
| $ZrO_2$ | 0.8 weight % |
| $P_2O_5$ | 0.2 weight % |
| ZnO | 2.2 weight %. |

This ceramic frit had previously been milled in a 500 g porcelain ball mill with the addition of 1.0 g propylene glycol to give a grain size distribution of >0 to 80 microns, with a grain size distribution maximum at 12 microns.

After intensive stirring, 615 g of an aqueous, 37 weight % sodium silicate solution was slowly added.

After 5 minutes of intensive granulation, the product obtained was heat-treated in a drying oven for 2 hours at 250° C.

After removing the coarse fraction greater than 500 microns by sieving, the coloured granular product obtained had a grain size distribution between >0 and 500 microns, with a grain size distribution maximum at 70 microns.

6 weight % of the coloured granular product obtained was incorporated in a glaze for floor tiles with the following composition:

10 weight % frit based on $SiO_2$, $B_2O_3$, $Al_2O_3$, $Na_2O$
10 weight % frit based on $SiO_2$, $B_2O_3$, $Al_2O_3$, $ZrO_2$
24 weight % sodium feldspar
5 weight % zinc oxide
20 weight % wollastonite
8 weight % alumina
17 weight % zirconium silicate
6 weight % kaolin.

After application to a white ceramic body, ceramic firing was carried out at 1170° C. for 70 minutes in a tunnel kiln.

An abrasion test was performed in accordance with European Standard EN 154, Method MCC (as described under 3.2). After 25,000 revolutions, a glaze abrasion of 0.58 g was obtained. The glaze without the granular material according to the invention exhibited a higher abrasion of 0.70 g. On the addition of 6 weight % corundum instead of the granular material according to the invention, the abrasion produced under identical conditions was 0.63 g.

What is claimed is:

1. White, black or coloured granular materials for the production of white, black, or coloured coatings of high abrasion-resistance, wherein the granular materials have the following composition:

| | |
|---|---|
| 2 to 40 weight % | of inorganic pigments, |
| 20 to 97 weight % | of one or more inorganic elements, inorganic compounds or mixtures thereof, said inorganic elements or inorganic compounds having a Mohs hardness of at least 7, |
| 1 to 25 weight % | of one or more inorganic binders, organic binders, or mixtures thereof, |
| 0 to 50 weight % | of one or more frits, glasses or mixtures thereof, and |
| 0 to 40 weight % | of one or more inorganic fillers; | wherein the granular material components excluding the binder or binders are dry- or wet-milled jointly or separately or in any combination to produce grain sizes from >0 to 100 microns, dried in the case of wet-milling, subsequently pulverized, granulated in a granulation unit with said one or more inorganic binders, organic binders, or mixtures thereof, in an amount from 1 to 25 weight %, based on the solids content of said binder or binders optionally with the addition of water or other suitable liquids, and then heat-treated between 150° C. and 500° C. for up to 24 hours.

2. A process for the production of white, black, or coloured granular materials as claimed in claim 1, wherein the granular material components excluding the binder or binders are wet-milled to a grain size of from >0 to 40 microns, mixed with said one or more inorganic binders, organic binders, or mixtures thereof, in an amount from 1 to 25 weight %, based on the solids content of said binder or binders, optionally with the addition of water, to form a suspension which is then atomized in a spray tower to form substantially spherical granules, and the granules are optionally heat-treated between 150° C. and 500° C. for up to 24 hours.

3. A method of using the white, black or coloured granular materials as claimed in claim 1, wherein said method comprises adding said granular materials to a coating composition and at least partially coating a substrate with said coating composition.

4. A method of using the white, black or coloured granular materials as claimed in claim 1, wherein said method comprises adding said granular materials to substances for the purpose of colouring said substances.

5. The method of claim 3, wherein said substrate consists essentially of at least one ceramic material.

6. The method of claim 4, wherein said substances comprise at least one of lacquers, plastics, ceramic coatings, enamel coatings, glasses and grinding media.

7. A method of using the granular materials as claimed in claim 1, wherein said method comprises adding said granular materials to at least one grinding media.

8. The process of claim 1, wherein said grain sizes are from >0 to 40 microns.

9. The process of claim 1, wherein said one or more inorganic binders, organic binders, or mixtures thereof, are present during said granulation in an amount from 2 to 15 weight %, based on the solids content of said binder or binders.

10. The process of claim 2, wherein said one or more inorganic binders, organic binders, or mixtures thereof, are present during said mixing in an amount from 2 to 15 weight %, based on the solids content of said binder or binders.

11. A ceramic glaze comprising the granular materials as claimed in claim 1.

12. A ceramic glaze as claimed in claim 11, wherein said glaze exhibits improved abrasion resistance in comparison to a similar glaze which does not contain said granular materials.

* * * * *